(No Model.) 2 Sheets—Sheet 1.

F. S. BORTON & C. F. BATES.
FARE RECEIPT SLIP.

No. 603,826. Patented May 10, 1898.

-FIG. I-

-FIG. II-

WITNESSES:
David Davies
N. E. Merkel

INVENTORS,
F. S. Borton &
C. F. Bates
BY Hall & Fay
ATTORNEYS.

(No Model.) 2 Sheets—Sheet 2.
F. S. BORTON & C. F. BATES.
FARE RECEIPT SLIP.
No. 603,826. Patented May 10, 1898.
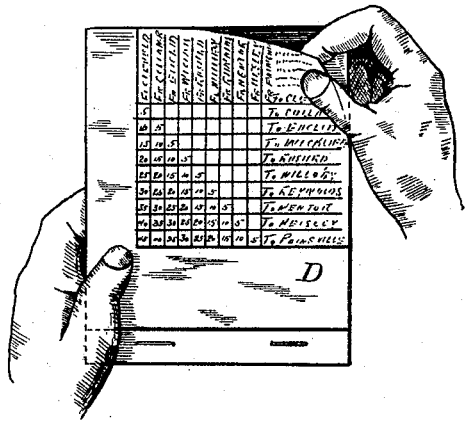
— FIG. III —
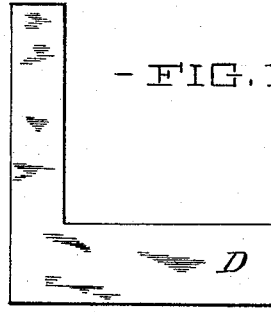
— FIG. V —
FIG. IV
WITNESSES:
David 2. Davies
N. Smerkel
INVENTORS,
F. S. Borton
C. F. Bates
BY Hall & Fay
ATTORNEYS.
THE NORRIS PETERS CO., PHOTO-LITHO., WASHINGTON, D. C.

UNITED STATES PATENT OFFICE.

FRED S. BORTON AND CHARLES F. BATES, OF CLEVELAND, OHIO.

FARE-RECEIPT SLIP.

SPECIFICATION forming part of Letters Patent No. 603,826, dated May 10, 1898.

Application filed February 9, 1897. Serial No. 622,654. (No model.)

*To all whom it may concern:*

Be it known that we, FRED S. BORTON and CHARLES F. BATES, citizens of the United States, and residents of Cleveland, county of Cuyahoga, and State of Ohio, have invented a new and useful Improvement in Fare-Receipt Slips, of which the following is a specification, the principle of the invention being herein explained and the best mode in which we have contemplated applying that principle so as to distinguish it from other inventions.

The annexed drawings and the following description set forth in detail certain means embodying the invention, such disclosed means constituting but one of various forms in which the principle of the invention may be used.

In the said annexed drawings, Figure I represents the obverse side of our improved fare-receipt slip, showing a part of the arrangement of the reverse side in dotted lines. Fig. II represents the reverse side of said slip. Fig. III represents a view of the slip and a paper-cutter, setting forth the manner of operating the device. Fig. IV represents the obverse side of the slip, showing a portion thereof removed; and Fig. V represents a view of the paper-cutter.

The slips A are arranged in the form of a book, each slip being provided with perforations $a$, by means of which they may be easily removed. Each slip has an obverse side A' and a reverse side A².

Along the upper edge of the side A' are arranged in a column $b$, in sequence, the names of the different stations between the termini of the route and including said termini, the arrangement beginning with the name of the initial terminus at the left and proceeding toward the right. On the right-hand edge is arranged, also in sequence, a similar column $c$ of the same stations, the name of the initial terminus being placed at the top.

Opposite each name in the column $b$ downwardly and opposite each name in the column $c$ laterally is placed a figure indicating the amount of fare required between each combination of two stations indicated by their names, the name of the station in said pair nearest the initial terminus being taken in the upper column and the name of the station in said pair farther from said terminus being taken in the right-hand column.

When arranged as above described the figures form a triangular figure, as shown.

For convenience transverse vertical lines $a'$ are drawn, forming small dividing-squares, in which the figures are appropriately placed.

A paper-cutter D, in the form of a carpenter's square, having its cutting edges on the inner edges, is provided and serves for a guide in tearing off the appropriate portion of the slip. In so tearing the slip the two cutting edges are placed along the transverse and vertical lines, as is shown in Fig. III, immediately to the left of the name of station in the upper column from which the passenger desires to travel and immediately below the name of the station to which the passenger desires to go. The upper right-hand corner is grasped and with a quick movement a rectangular portion is torn off. It will be seen that the figure in the lower left-hand corner indicates the amount of fare to be paid. This removed portion, Fig. IV, on payment of the fare indicated is handed to the passenger as a receipt.

Along the lower edge of the slip and below the figures are suitably placed the series letter and the book and ticket numbers, which always remain on the unremoved part of the slip.

The arrangement of the reverse side will now be described, and the portion having the perforation will be considered the upper portion, the right-hand side corresponding to the right-hand side of the obverse side. On the said reverse side a column $e$, exactly like column $b$, is placed along the top, and a column $f$ is placed along the left-hand edge and differs from column $c$ only in that the order of the names is reversed. The numbers or figures indicating the amount of fare have their location determined exactly in the manner used to locate the figures on the obverse side.

Looking at the obverse side and through the slip the names and figures are seen as indicated by the dotted lines shown in Fig. I.

It is thus seen that the four columns form a parallelogram, in this case a rectangle, which they surround, the transverse and vertical lines forming the boundaries of said rectangle and also the small subdivisions. The lines on the opposite side are made to coincide, so that the rectangles on each side coincide with each other; but instead of each square on the one side coinciding with the same square on the opposite the column on the left hand of the reverse side is moved downwardly, looking at the obverse side, the distance of one small square, or upwardly when looking at the reverse side, whereby instead of each number on the obverse side having the same number directly opposite on the reverse side the same number is moved, as before stated.

The numbers on the obverse side of the slip form numerical progressions from top to bottom and from right to left, each number having opposite it on the reverse side the figure next below it in the progression. To describe the arrangement in other words, the numbers are arranged in a series of lines, the extremities of which, if joined, would form the sides of an isosceles triangle, the said lines being parallel to the equal legs of said triangle and progressing from the base toward legs of the triangle, each figure having opposite it on the reverse side the figure next below it in the same progression of which it is one member. In the case illustrated, the increment in the fare between successive stations being equal, the progressions are arithmetical, the first number of which may be understood to be "0." This shifting removes the number on the reverse side, indicating the amount of fare paid, out of the removed portion of the slip, the dotted line in Fig. II indicating the line of tear on the reverse side when the slip is torn, as indicated in Fig. IV. It is thus seen that the figure "20," which is in the lower left-hand corner of the torn portion, is above said portion on the reverse side and remains on the unremoved portion of the slip in every instance, which thus forms a conductor's memorandum of the amount received, and the amount will always be indicated on the said reverse side immediately above the upper line of tear and at the extreme left thereof.

In the lower right-hand corner of the reverse side of the passenger's receipt is placed the book and ticket number, which correspond to the book and ticket number on the unremoved portion, and the removed and unremoved portions may thereby be identified.

Other modes of applying the principle of our invention may be employed instead of the one explained, change being made as regards the means herein disclosed, provided the means set forth in one of the following claims be employed.

We therefore particularly point out and distinctly claim as our invention—

1. In a fare-slip, a series of numbers on one side indicating the amount of fare between two stations, said numbers arranged in lines forming numerical progressions, a series of names of stations, suitable means for identifying each number with two stations between which said number indicates the amount of fare, each number having opposite on the other side of said slip, the number next below it in the progression of which it is a member, substantially as set forth.

2. In a fare-receipt slip, a series of numbers on one side indicating the amount of fare between two stations, said numbers arranged in lines in two directions and forming numerical progressions in both said directions, a series of names of stations, each name appearing twice in said series, and suitable means for identifying each number with two stations between which said number indicates the amount of fare, each number having opposite it on the other side of said slip, the number next below it in the progression of which it is a member, substantially as set forth.

3. In a fare-receipt slip a series of numbers on one side indicating the amount of fare between two stations, said numbers arranged in lines in two directions and forming numerical progressions in both said directions, each number having opposite it on the other side the number next below it in the progression and having opposite it in the direction of each line the name of one of the two stations between which it indicates the fare, substantially as set forth.

4. A fare-receipt slip having an obverse and a reverse side, and provided on the obverse side with a column of names of the stations arranged in sequence along one side of a parallelogram, and a similar column arranged along an adjacent side of said parallelogram, and having the amount of fare between any two stations indicated at the junction of a line drawn from the name of one of said two stations in one column parallel with the adjacent side of the parallelogram and another line drawn from the name of the other station in the second-named column and parallel with the side of the parallelogram adjacent to its side, the reverse side being similarly arranged with respect to the same parallelogram, but having one column shifted a distance substantially equal to the distance between two successive names on the obverse side, substantially as set forth.

5. A fare-receipt having an obverse and a reverse side, and provided on the obverse side with a column of names of stations arranged in sequence along one side of a parallelogram and a similar column arranged along an adjacent side of said parallelogram and having the amount of fare between any two stations indicated at the junction of a line drawn from one of said stations on one column, parallel with the adjacent side of the parallelogram and another line drawn from the name of the other station in the second-named column and parallel with the side of the parallelogram adjacent to its side, the reverse side having similar columns arranged along the other two adjacent sides of the same parallelogram and having the fare amounts arranged in the same manner as on the obverse side, one of said columns on said reverse side being shifted a distance substantially equal to the distance between two successive names, substantially as set forth.

Signed by us this 6th day of February, 1897.
FRED S. BORTON.
CHARLES F. BATES.

Attest:
DAVID T. DAVIES,
A. E. MERKEL.